United States Patent [19]

Ogle

[11] Patent Number: 4,458,134
[45] Date of Patent: Jul. 3, 1984

[54] METHOD AND APPARATUS FOR DRILLING HOLES WITH A LASER

[75] Inventor: James A. Ogle, Neshanic Station, N.J.

[73] Assignee: Burroughs Corporation, Detroit, Mich.

[21] Appl. No.: 393,694

[22] Filed: Jun. 30, 1982

[51] Int. Cl.³ .............................................. B23K 27/00
[52] U.S. Cl. ......................... 219/121 LK; 219/121 LL
[58] Field of Search ................. 219/121 LK, 121 LL, 219/121 FS, 121 LE, 121 LF, 121 EH, 121 EF, 121 EG

[56] References Cited

U.S. PATENT DOCUMENTS

| | | |
|---|---|---|
| Re. 27,772 | 10/1973 | Hantmann ...................... 219/121 LJ |
| 3,410,979 | 11/1968 | Larsson ................... 219/121 LK X |
| 3,562,009 | 2/1967 | Cranston et al. ......... 219/121 EH X |
| 3,742,182 | 6/1973 | Saunders ....................... 219/121 LL |
| 4,239,954 | 12/1980 | Howard et al. .............. 219/121 EH |

*Primary Examiner*—C. L. Albritton
*Attorney, Agent, or Firm*—Kevin R. Peterson; Edmund M. Chung; Robert A. Green

[57] ABSTRACT

Method and apparatus for drilling holes with a laser comprising a support member carrying an insulating sheet which supports a metal plate in which holes are to be drilled by a laser. The insulating sheet serves to blow molten metal out of the holes as they are formed and prevents metal from depositing on the plate around the holes.

9 Claims, 2 Drawing Figures

METHOD AND APPARATUS FOR DRILLING HOLES WITH A LASER

BACKGROUND OF THE INVENTION

One type of display panel described in copending application Ser. No. 051,313 of George E. Holz and James A. Ogle, filed June 22, 1979, includes a thin metal plate having a large number of small-diameter holes. At the present time, these holes are formed by means of a laser, and this hole-forming operation is generally satisfactory. However, one problem is that the material of the metal plate which is removed by the laser sometimes deposits on the surface of the plate near each hole as it is formed. This results in an uneven surface and non-uniform spacing of the plate from other associated structures in the panel. One solution which is employed comprises coating the metal plate with a protective insulating coating, but this requires extra steps. The present invention provides a solution to this problem.

DESCRIPTION OF THE INVENTION

Figure 1:
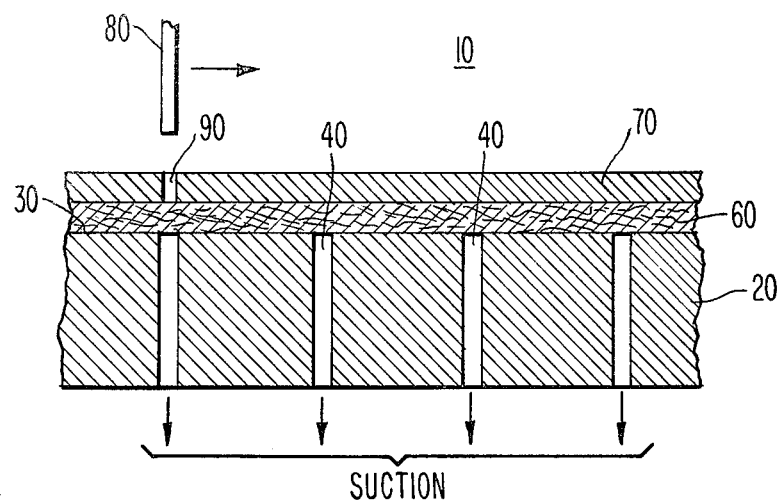
FIG. 1 is a sectional, elevational view of apparatus embodying the invention.
Figure 2:
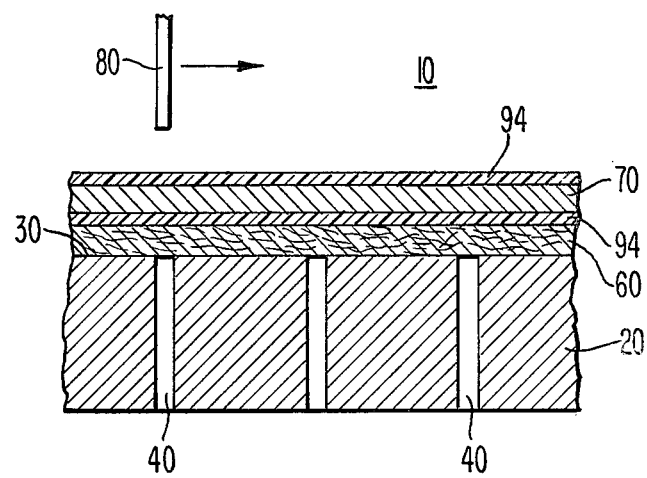
FIG. 2 is a sectional, elevational view of a modification of the apparatus of FIG. 1.

The principles of the invention are illustrated in the apparatus 10 shown in FIG. 1 which includes a support member 20 comprising a metal plate having a top support surface 30 in which a plurality of holes or slots 40 are formed.

According to the invention, in operation of the apparatus 10, a sheet 60 of insulating material such as paper, bond paper, tissue paper, filter paper, cardboard, or the like, hereinafter called paper, is seated on the top surface of member 20.

A metal plate 70 to be operated on, for example to form small holes therein, is seated on paper sheet 60 and is held down by suction, by clamping, or in any suitable manner. A laser 80 is movably disposed above the apparatus 10 in position to direct its energy onto the metal plate 70.

In operation of the apparatus 10, the laser 80 is adjusted and operated to direct a pulse of energy of the desired diameter onto the metal plate 70. This energy pulse penetrates the plate 70, and, as it penetrates, it renders a small cylinder of metal partly molten and partly vaporized, and the vaporized metal blows the molten metal out of the plate. When the energy pulse penetrates through the metal plate, the paper sheet receives energy at the end of the pulse, and the paper then operates like a jet to drive the molten metal out of the plate and to leave a neatly formed hole 90 with both surfaces of the plate, around the hole, clean. The laser pulse terminates as it reaches the paper sheet.

The laser is moved from place to place to form holes 90 in the desired locations in the plate 70.

It is noted that, if the paper sheet 60 is suitably porous so that air can pass through it, then suction force can be coupled to the holes or slots 40 in support plate 20 to hold plate 70 down on the plate 20.

With respect to the laser 80, it has been found that a YAG laser can be operated to provide a pulse of the optimum energy and length for the proper operation of the invention. The output pulse of a $CO_2$ laser may not be controllable to terminate after the plate 70 has been penetrated, in which case, the paper sheet might be ruptured. In this case, a protective coating 94 of lacquer or the like may be provided on both upper and lower surfaces of the plate 70 to prevent metal from depositing thereon.

After all of the desired holes are formed in the plate 70 with the YAG laser, it is removed from the support apparatus, and it is ready for use as required without any special time consuming operations except perhaps for cleaning.

What is claimed is:

1. Apparatus for drilling holes with a laser in a metal plate comprising
    a support apparatus having a support surface for supporting a metal plate in which holes are to be drilled with a laser,
    an insulating sheet on said support surface of said support apparatus,
    a metal plate, to be drilled, loosely seated on said insulating sheet, and
    a laser disposed above said support apparatus and positioned to form holes in said metal plate seated on said insulating sheet, said insulating sheet serving to prevent molten metal from depositing on said metal plate at the hole formed therein.

2. The apparatus defined in claim 1 wherein said insulating sheet is paper.

3. Apparatus for drilling held holes with a laser in a metal plate comprising
    a suction apparatus having a support surface for supporting a metal plate in which holes are to be drilled with a laser,
    an insulating porous sheet on said support surface of said suction apparatus, the insulating sheet being sufficiently porous to permit air to be drawn therethrough,
    a metal plate, to be drilled, on said insulating porous sheet, by said suction apparatus and
    said laser disposed above said suction apparatus and positioned to form holes in a metal plate seated on said insulating sheet, said insulating sheet serving to prevent molten metal from depositing on said metal plate at the hole formed therein.

4. The method of drilling holes with a laser in a metal plate comprising the steps of
    supporting a metal plate on a support plate,
    providing an insulating sheet between the metal plate and the support plate,
    holding said metal plate and said insulating sheet together as a temporary assembly,
    directing energy from a laser onto said metal plate to form a hole in said metal plate, said insulating sheet serving to prevent molten metal from depositing on said metal plate at the hole formed therein, and
    removing said metal plate from said temporary assembly.

5. The method of drilling holes with a laser in a metal plate comprising the steps of
    supporting a metal plate on an apertured support plate,
    providing an insulating sheet between the metal plate and the support plate,
    directing energy from a laser through said metal plate to form a hole in said metal plate, said insulating sheet serving to eject molten metal from said metal plate as it is formed by the laser and thus preventing it from depositing on said metal plate at the hole formed therein, and removing said metal plate from its position on said insulating sheet so that it can be processed as desired.

6. The apparatus defined in claim 1 wherein said insulating sheet is a paper-type material.

7. The apparatus defined in claim 1 wherein said insulating sheet is cardboard.

8. The apparatus defined in claim 1 wherein said insulating sheet is tissue paper.

9. The apparatus defined in claim 1 wherein said insulating sheet is filter paper.

* * * * *

UNITED STATES PATENT OFFICE
CERTIFICATE OF CORRECTION

Patent No. 4,458,134          Dated  July 3, 1984

Inventor(s)  James A. Ogle

It is certified that error appears in the above-identified patent and that said Letters Patent are hereby corrected as shown below:

Claim 3, Line 1, delete "held";

Claim 3, Line 10, after "drilled," insert --held--;

Claim 3, Line 12, delete "said" (first occurrence) and insert --a--;

Claim 3, Line 13, change "a" to --said--.

Signed and Sealed this

Nineteenth Day of March 1985

[SEAL]

*Attest:*

DONALD J. QUIGG

*Attesting Officer*     *Acting Commissioner of Patents and Trademarks*